Aug. 31, 1926.

W. LEE 1,598,290

SAWDUST DISTILLING APPARATUS

Filed April 4, 1925

Inventor:
Wict Lee
By
Attorneys

Aug. 31, 1926.
W. LEE
1,598,290
SAWDUST DISTILLING APPARATUS
Filed April 4, 1925   2 Sheets-Sheet 2
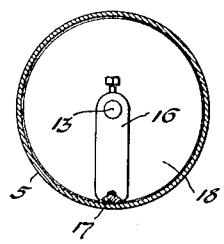
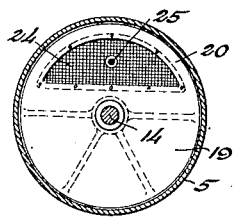
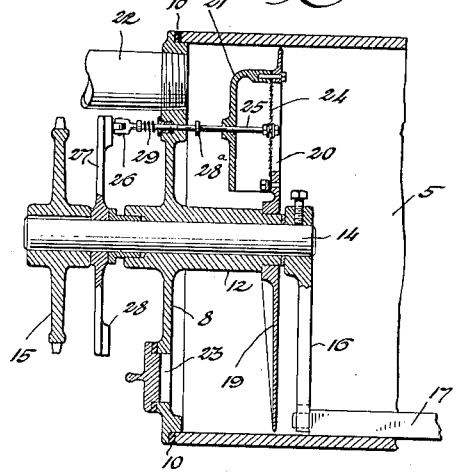
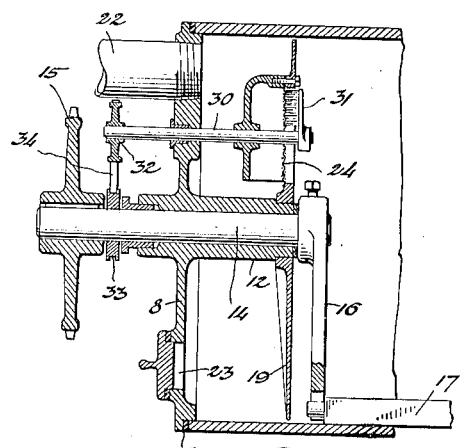
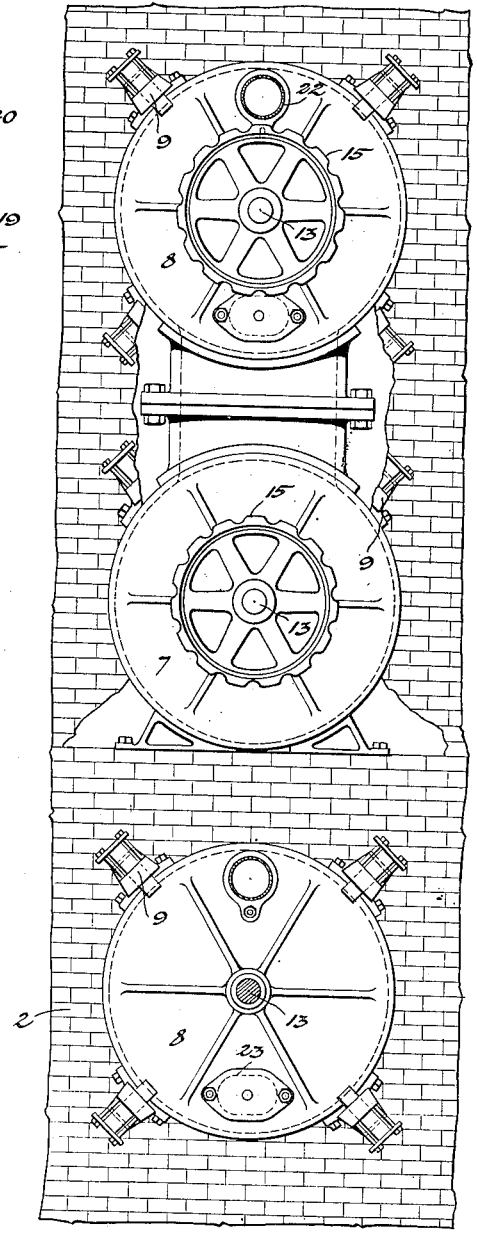

Patented Aug. 31, 1926.

1,598,290

UNITED STATES PATENT OFFICE.

WIRT LEE, OF DETROIT, MICHIGAN.

SAWDUST-DISTILLING APPARATUS.

Application filed April 4, 1925. Serial No. 20,682.

This invention relates to a distilling apparatus and has special reference to the distillation of organic material for the production of charcoal, pyroligneous acid, containing a large percentage of methyl, alcohol, and like substances, and wood gas suitable for lighting and fuel purposes.

The primary object of my invention is to provide a durable and efficient apparatus, which with a change of structure or general mode of operation, may be used for the distillation of organic refuse and waste materials, as sawdust, waste wood from woodworking plants, drift wood, old railway ties, straw and the like.

Another object of my invention is to provide an apparatus that may be used for the odorless disposal of garbage within the limits of municipalities.

My invention further aims to provide an apparatus wherein a continuous process of distillation may be carried on without any danger of the parts of the apparatus being clogged or rendered inoperative by by-products resulting from distillation. It is a well known fact that in the distillation of sawdust or like organic material, considerable trouble has been experienced by finely divided material being carried off with the gases and vapors in the conduits, condensing pipes, and auxiliary apparatus, causing such conduits to become clogged and interfere with the flow of gases and vapors, necessitating frequent cleaning of the conduits which interferes with a continuous performance of the apparatus. This is particularly true in connection with the incineration or distillation of garbage and like materials that must be stirred or continually agitated during the process of distillation.

A further object of my invention is to provide an apparatus including a retort or series of retorts, all heated from a common source, and in the retorts are mechanically driven agitators of novel design adapted to prevent excessive burning or baking of material during its distillation.

In the retorts are screening devices of novel construction by which small particles of matter are prevented from entering gas or vapor conduits, and these screening devices are an important feature of my invention and contribute to the practicability of the apparatus compared with other distilling apparatus.

My invention will be hereinafter specifically described and then claimed, and reference will now be had to the drawings, wherein—

Fig. 2 is an end view of a portion of the apparatus;

Fig. 3 is a cross-sectional view of a retort taken on the line III—III of Fig. 1;

Fig. 4 is a similar view taken on the line IV—IV of Fig. 1;

Fig. 5 is an enlarged longitudinal sectional view of an end of a retort showing a screening device, and Fig. 6 is a similar view of the end of a retort illustrating a modified form of screening device.

Figure 1:
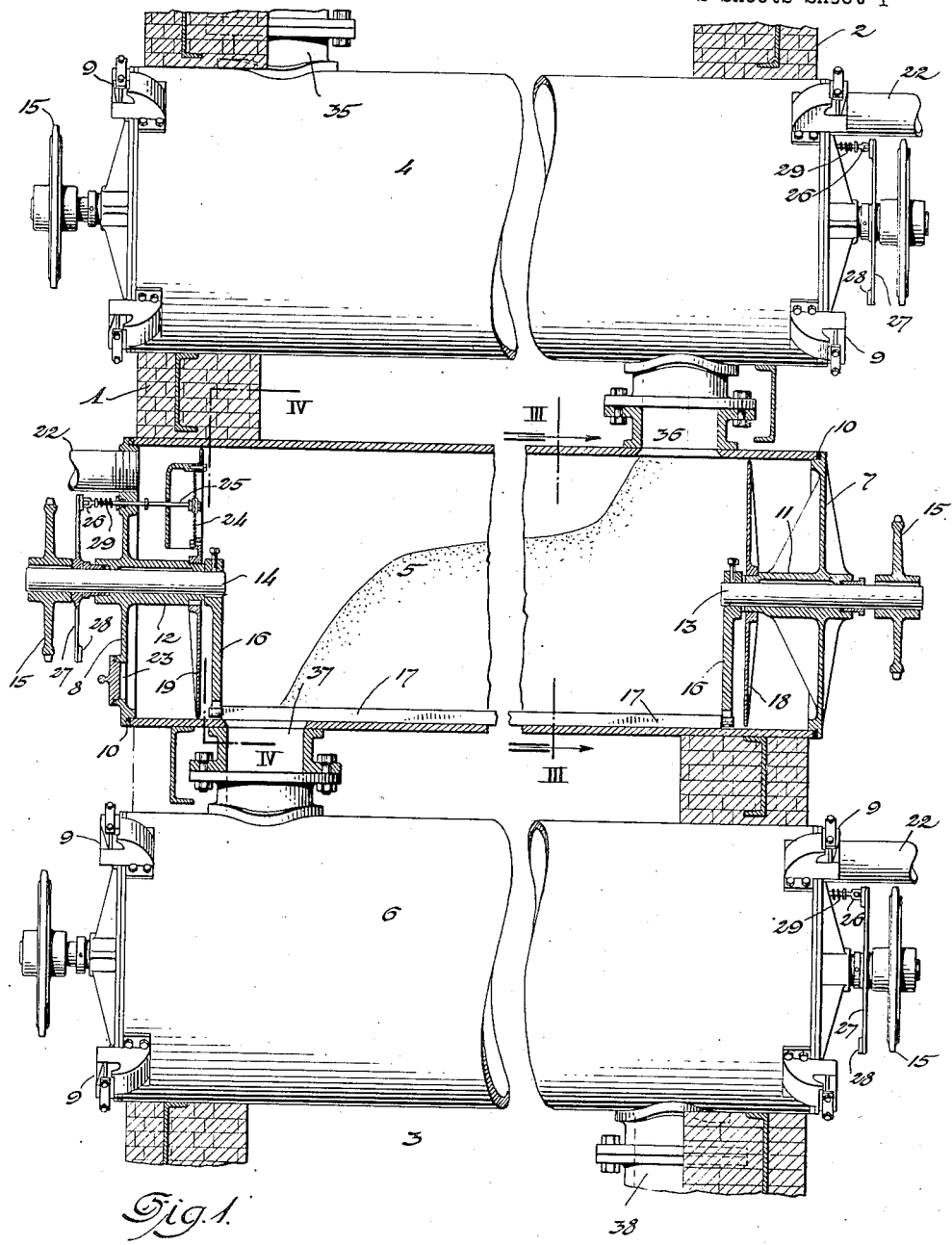
Figure 1 is a vertical sectional view of a distilling apparatus showing a plurality of retorts, partly broken away and partly in section.

In the drawings, the reference numerals 1 and 2 denote walls of a furnace or other heating apparatus and for the purpose of understanding this invention the reference numeral 3 denotes a heating chamber in which the temperature may be regulated by any suitable means forming no part of this invention.

In the distillation or incineration of material, various types of heating apparatus may be employed with various kinds of temperature control devices which permit of various temperatures throughout the apparatus so that during the process of distillation one part of the apparatus may be maintained at a higher or lower temperature than other parts, all of which depends upon the material being treated and the by-products to be derived therefrom.

Mounted in the furnace walls 1 and 2 are a plurality of superposed horizontal cylindrical retorts 4, 5, and 6, representing a series or one of a group of similar retorts that may be built in the furnace structure.

For the detail construction of one of these retorts, the longitudinal sectional view of the retort 5 will be considered. The ends of the retort 5 have detachable walls 7 and 8 and these walls are adapted to be clamped against the ends of the retort by clamping devices 9 which may be of wedge type. Suitable sealing gaskets or rings 10 may be employed to insure a non-leakable connection between the shell or body of each retort and its end walls. The end walls 7 and 8 have longitudinally aligning bearings 11 and 12 respectively for co-axial shafts 13 and 14 which have the outer ends thereof provided with sprocket wheels 15 or other power transmission members which will permit of the shafts 13 and 14 of all of the retorts being operated in synchronism from a suitable source of power.

On the inner ends of the shafts 13 and 14 are radially disposed arms 16 which have the lower ends thereof loosely articulated with the ends of a stirring or agitating member 17 disposed longitudinally of the retort and adapted to engage the inner cylindrical wall of a retort to scrape said wall and prevent material from being baked and adhere to the wall. As shown, the agitating member 17 may have spindles at its ends engaging in notched ends of the arms 16.

Mounted on the bearings 11 and 12 are end partitions 18 and 19 and the partitions 19 are provided with screening devices which may be of various forms and two of which I will now describe, with special reference to Figs. 5 and 6 of the drawings.

Mounted over an opening 20 of the partition 19 is a deflector 21 attached to the outer wall of said partitions and adapted to deflect gases and vapors downwardly between the partition 19 and the end wall 8 so that gases and vapors can not directly enter a gas or vapor outlet conduit 22 extending to condensers or auxiliary apparatus (not shown). In deflecting the gases and vapors downwardly there is a chance of sediment to accumulate on the bottom wall of a retort and the end wall 8 has a normally closed hand hole 23 that will permit of the end portion of the retort being cleaned when occasion so requires.

Sandwiched between the deflector 21 and the partition 19 is a flexible vibratory sieve or screen member 24 through which gases and vapors must pass in order to reach the conduit 22 and suitably attached to the central portion of the sieve or screen is the inner end of a reciprocatory rod 25 extending through the deflector 21 and the end wall 8 of the retort, said rod having its outer end provided with an anti-frictional bearing 26 for engagement with a vibratory member 27 mounted on the shaft 14 for rotation therewith.

The vibratory member 27 may be of various forms and has been shown as a disk provided with one or more cam surfaces 28 which will cause rapid reciprocation of the rod 25 and flexure or vibration of the sieve or screen 24. On the rod 25 may be stop shoulders 28ᵃ and springs 29, the former limiting the movement of the rod 25 and the latter co-operating with the vibratory member 27 in causing reciprocation of the rod 25. It is obvious that the vibratory member 27 may be constructed to reciprocate the rod 25 in both directions and obviate the necessity of using the spring 29.

Considering Fig. 6 of the drawings, a rotary rod or shaft 30 is employed and its inner end provided with a brush or like device 31 for contact with the sieve or screen 24 to clean the same. On the outer end of the rotary rod 30 is a power transmission wheel 32 aligning with a similar wheel 33 on the shaft 14 so that a power transmission member 34 may drive the rod 30 in unison with the shaft 14.

Referring again to Figs. 1 and 2, of the drawings, the uppermost retort 4, adjacent the wall 1, is provided with an inlet connection 35 by which sawdust or other material may be deposited in the retort 4 and shifted towards the opposite end of the retort to pass therefrom through a communicating connection 36 into the intermediate retort 5. From this retort the material finds its way through another communicating connection 37 to the retort 6 and from this lower retort the residue may be removed by the discharge connection 38. The connections 35 to 38 inclusive are in staggered relation so that heaping masses may be maintained in the retorts and subjected to heat to liberate gases, vapors and other by-products which are adapted to be screened when passing off to the conduits 22 which are also in staggered relation with each conduit at the opposite end of the retort from that which receives a charge of material. The stirring or agitating members 17 in each retort will keep the material moving sufficiently to prevent packing on the bottom of the retort, which might interfere with the liberation of gaseous by-products and which might cause the material to be baked to the extent of adhering to the bottom of a retort. My form of swingable, stirring or agitating device is in contradistinction to spiral or screw conveyors which simply move quantities of material lengthwise of a retort without materially disturbing the upper surface or body of the material, consequently there is a chance for such conveyed material to settle and interfere with the passage of gaseous by-products therefrom. My stirring or agitating devices keep the material in constant turbulation whereby all particles are subjected to a uniform heating and constant distillation, and by virtue of the retorts being in superposed relation, it is obvious that there will be a different degree or stage of distillation in each retort and that any heat emitted by a lowermost retort may be absorbed by an uppermost retort.

In practice, I prefer to regulate the heat so that higher temperatures are at all ends of the retorts containing the screening devices, whereby the heat may be depended upon, to a certain extent, for removing tar and resinous matter from the screens or sieves, thus preventing the same from being clogged by such matter accumulating thereon.

The partitions in the ends of each retort serve to hold the material within uniformly heated zones in each retort and prevent the material from contacting with cooler portions of the retort surrounded by the walls 1.

From the foregoing it will be noted that my apparatus, while specially designed for the distillation of sawdust, may be readily adapted for the destructive distillation or incineration of other organic materials, and with all retort connections thoroughly sealed the apparatus is practically odorless.

There are other advantages gained, such as minimum heat for a maximum distillation; treatment of coarse organic matter as well as finely divided material, and a reduction in the time and labor required for complete distillation of a given amount of organic material with a maximum yield and quality of by-products incident to the process involved.

I attach considerable importance to the screening device being located in the retorts and at such places where the devices, by the application of heat and mechanical means, may be kept clean and in operative condition without causing a cessation in the process of distilling.

It will be noted, by reference to Fig. 1 and the retort 5, that the arrangement of inlet and outlet connections for said retort is such as to maintain a heaping or sloping mass of material in said retort and when this material is agitated it is gradually discharged at the outlet connection 37 into the lowermost retort. The agitator in swinging through this mass of material sufficiently directs the same to permit of gases and vapor escaping and all particles of masses being subjected to heat. Then again, by maintaining the mass of material away from the ends of the retort, it is maintained at the heated portions of the retort and there is sufficient space at one end of the retort for gases or vapors to pass through the screen into the bottom outlet conduit.

While in the drawings there are illustrated the preferred embodiments of my invention, it is to be understood that the structural elements are susceptible to such changes as are permissible by the appended claims.

What I claim is:—

1. In a distilling apparatus wherein material placed in a retort is heated to generate gases or vapors adapted to pass from the retort for the production of by-products, and wherein such gases or vapors are liable to carry off fine particles of material and clog retort connections;—means for separating such fine particles from the gases or vapors, said means comprising a deflector, a vibratory screen at said deflector, and means attached to said screen adapted for vibrating said screen.

2. In a distilling apparatus wherein material placed in a retort is heated to generate gases or vapors adapted to pass from the retort for the production of by-products, and wherein such gases or vapors are liable to carry off fine particles of material and clog retort connections;—means for separating such fine particles from the gases or vapors, said means comprising a partition in one end of the retort, a deflector carried by said partition, a screen at one end of said deflector, and cleaning means for said screen.

3. A distilling apparatus comprising a series of horizontal retorts subjected to heat and adapted to have material pass from one retort to the other and lengthwise of each retort to liberate gases and vapors, an outlet conduit for each retort, a screen in each retort adjacent each outlet conduit thereof and adapted to arrest fine particles of material held in suspension by the gases or vapors, and means attached to the screen for cleaning said screen.

4. A distilling apparatus comprising a series of horizontally elongated retorts subjected to heat and adapted to have material pass from one retort to the other and lengthwise of each retort to liberate gases and vapors, an outlet conduit for each retort, a screen in each retort adjacent each outlet conduit thereof and adapted to arrest fine particles of material held in suspension by the gases or vapors, and means exteriorly of each retort and extending therein and attached to each screen adapted for vibrating each screen.

5. A distilling apparatus comprising a series of superposed horizontal retorts adapted to be subjected to heat to distill material passing from one retort to the other and lengthwise of each retort to liberate gases and vapors, end partitions in each retort, an agitator, between the partitions of each retort whereby the material is caused to feed from one partition towards the other, a screen in connection with the last mentioned partition adapted to permit gases and vapors to pass through said partition and arrest fine particles that may be carried by the gases and vapors, and an outlet conduit carried by each retort adjacent said screen with a deflector between said screen and the outlet conduit.

6. In a distilling apparatus spaced walls, a retort having its ends supported in said walls and that portion of said retort between said walls adapted to be subjected to heat, inlet and outlet connections for said retort so that material may pass through said retort, a gas outlet conduit for said retort, means maintaining material in said retort in said portion thereof, a screen supported by a portion of said means adjacent said outlet conduit, and a material agitator in said retort.

7. A distilling apparatus as called for in claim 6 and means exteriorly of said retort for vibrating said screen.

8. A distilling apparatus as called for in claim 6 further characterized by the retort being horizontally elongated and longitudinal means in said retort for operating said agitator.

In testimony whereof I affix my signature.

WIRT LEE.